(12) United States Patent
Abedini et al.

(10) Patent No.: US 12,149,978 B2
(45) Date of Patent: *Nov. 19, 2024

(54) SELF INTERFERENCE AND CROSS LINK INTERFERENCE MANAGEMENT OF BIDIRECTIONAL SMART REPEATERS

(71) Applicant: QUALCOMM Incorporated, San Diego, CA (US)

(72) Inventors: Navid Abedini, Basking Ridge, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,831

(22) Filed: May 15, 2023

(65) Prior Publication Data

US 2023/0284070 A1    Sep. 7, 2023

Related U.S. Application Data

(63) Continuation of application No. 17/323,907, filed on May 18, 2021, now Pat. No. 11,689,953.

(51) Int. Cl.
*H04B 7/155* (2006.01)
*H04B 17/345* (2015.01)
(Continued)

(52) U.S. Cl.
CPC ........ *H04W 24/10* (2013.01); *H04B 7/15528* (2013.01); *H04B 7/15585* (2013.01);
(Continued)

(58) Field of Classification Search
CPC ..... H04B 7/02–17; H04B 17/0082–409; H04J 11/0023–0093;
(Continued)

(56) References Cited

U.S. PATENT DOCUMENTS

| 6,049,538 A | 4/2000 | Scott |
| 11,689,953 B2 * | 6/2023 | Abedini ................ H04W 24/10 |

(Continued)

FOREIGN PATENT DOCUMENTS

| CN | 103875301 A | 6/2014 |
| CN | 110505639 A | 11/2019 |

OTHER PUBLICATIONS

International Search Report and Written Opinion—PCT/US2022/024294—ISA/EPO—Jul. 18, 2022.

*Primary Examiner* — Timothy J Weidner
(74) *Attorney, Agent, or Firm* — Procopio, Cory, Hargreaves & Savitch LLP

(57) ABSTRACT

A configuration for self interference and cross link interference (CLI) management of bidirectional smart repeaters. The apparatus transmits, to a first wireless device, a measurement configuration to measure interference. The measurement configuration comprising a first measurement occasion and a second measurement occasion. The apparatus receives, from the first wireless device, a report of measured interference at the first wireless device based on the measurement configuration. Part of the measured interference under the first measurement occasion is based at least on transmissions forwarded by a relay node.

26 Claims, 14 Drawing Sheets

(51) Int. Cl.
*H04B 17/40* (2015.01)
*H04W 16/26* (2009.01)
*H04W 24/08* (2009.01)
*H04W 24/10* (2009.01)
*H04W 40/16* (2009.01)
*H04W 84/04* (2009.01)
*H04W 88/02* (2009.01)
*H04W 88/08* (2009.01)
*H04W 92/02* (2009.01)
*H04W 92/10* (2009.01)
*H04W 92/18* (2009.01)
*H04W 92/20* (2009.01)

(52) U.S. Cl.
CPC ........... *H04B 17/345* (2015.01); *H04B 17/40* (2015.01); *H04W 16/26* (2013.01); *H04W 24/08* (2013.01); *H04W 40/16* (2013.01); *H04W 84/047* (2013.01); *H04W 88/02* (2013.01); *H04W 88/08* (2013.01); *H04W 92/02* (2013.01); *H04W 92/10* (2013.01); *H04W 92/18* (2013.01); *H04W 92/20* (2013.01)

(58) Field of Classification Search
CPC .. H04J 2011/0003–0096; H04L 5/0001–0098; H04W 8/22–245; H04W 16/24–32; H04W 24/02–10; H04W 28/02–26; H04W 36/0005–385; H04W 40/005–38; H04W 48/02–20; H04W 56/0005–0095; H04W 72/02–569; H04W 74/002–008; H04W 84/005–22; H04W 88/02–12; H04W 92/02–04; H04W 92/10–12; H04W 92/16–22

See application file for complete search history.

(56) References Cited

U.S. PATENT DOCUMENTS

| | | | |
|---|---|---|---|
| 2013/0137364 A1* | 5/2013 | Redana | H04W 24/02 |
| 2013/0242771 A1 | 9/2013 | Ohta et al. | |
| 2015/0236777 A1 | 8/2015 | Akhtar et al. | |
| 2021/0218484 A1* | 7/2021 | Yuan | H04W 24/10 |
| 2021/0219155 A1 | 7/2021 | Ye et al. | |

* cited by examiner

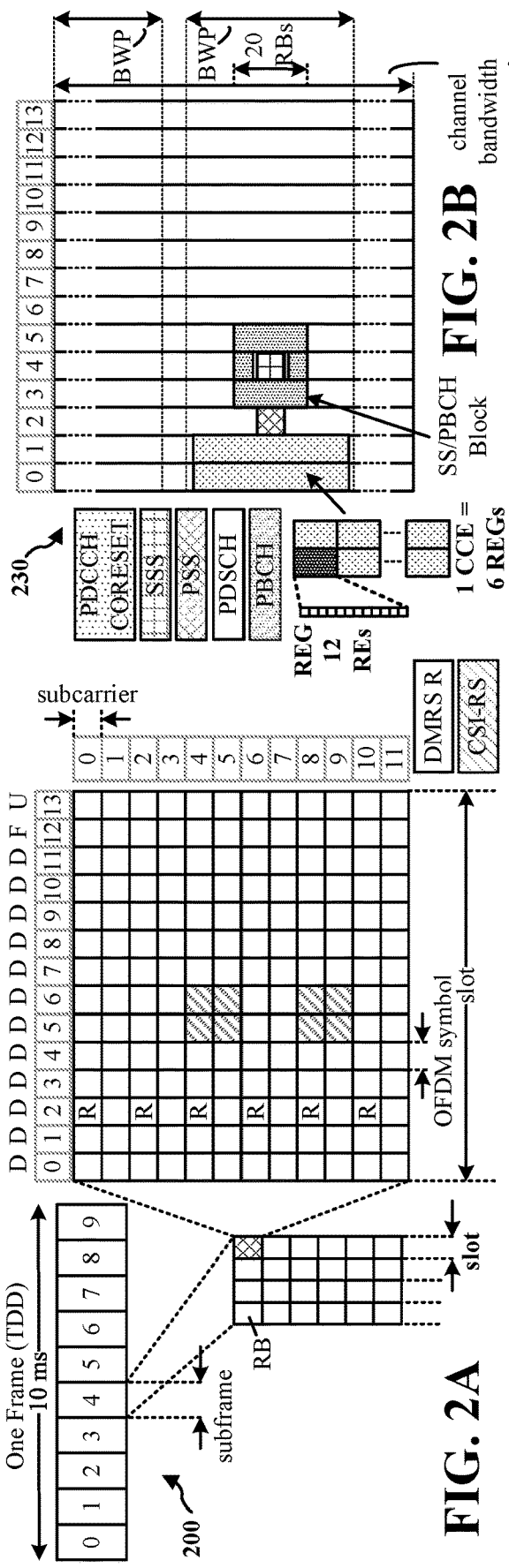
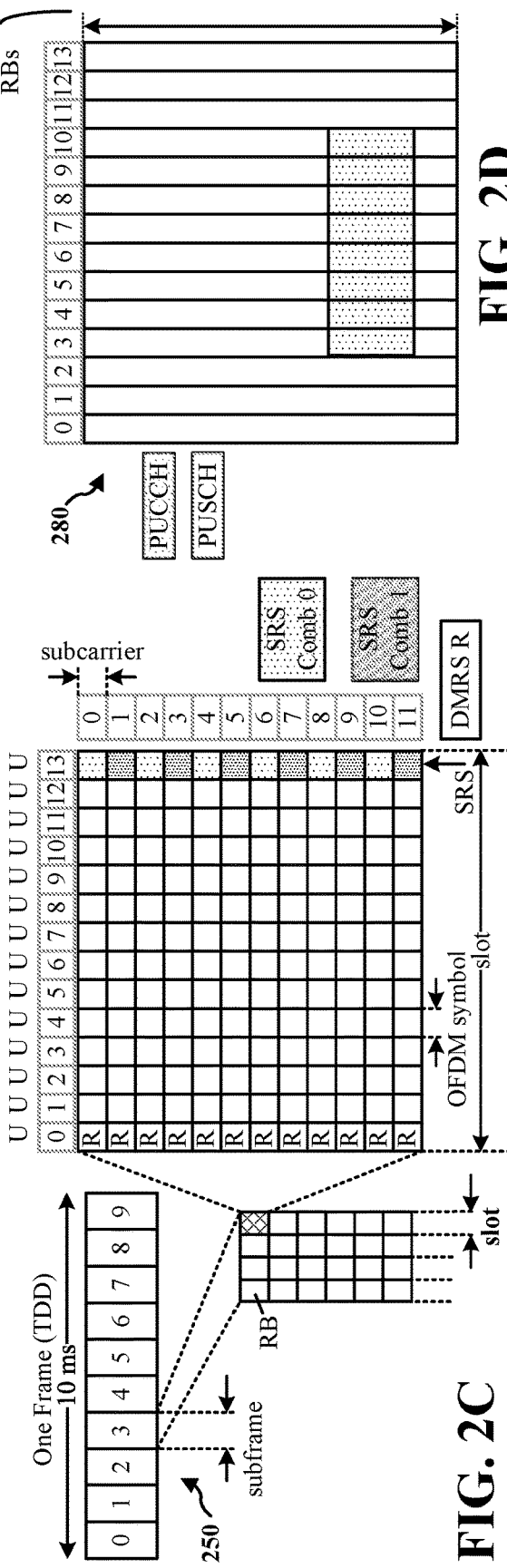
FIG. 2A FIG. 2B FIG. 2C FIG. 2D

SELF INTERFERENCE AND CROSS LINK INTERFERENCE MANAGEMENT OF BIDIRECTIONAL SMART REPEATERS

CROSS REFERENCE TO RELATED APPLICATION(S)

This application is a Continuation of U.S. patent application Ser. No. 17/323,907, entitled "SELF INTERFERENCE AND CROSS LINK INTERFERENCE MANAGEMENT OF BIDIRECTIONAL SMART REPEATERS" and filed on May 18, 2021, which is expressly incorporated by reference herein in its entirety.

TECHNICAL FIELD

The present disclosure relates generally to communication systems, and more particularly, to a configuration for self interference and cross link interference (CLI) management of bidirectional smart repeaters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a control node. The device may be a processor and/or a modem at a control node or the control node itself. The apparatus transmits, to a first wireless device, a measurement configuration to measure interference. The measurement configuration comprising a first measurement occasion and a second measurement occasion. The apparatus receives, from the first wireless device, a report of measured interference at the first wireless device based on the measurement configuration. Part of the measured interference under the first measurement occasion is based at least on transmissions forwarded by a relay node.

In an aspect of the disclosure, a method, a computer-readable medium, and an apparatus are provided. The apparatus may be a device at a first wireless device. The device may be a processor and/or a modem at a first wireless device or the first wireless device itself. The apparatus receives, from a control node, a measurement configuration to measure interference. The measurement configuration comprising a first measurement occasion and a second measurement occasion. The apparatus measures interference at the first wireless device based on the measurement configuration. The first wireless device communicates with a second wireless device via a relay node that relays transmissions between the first wireless device and the second wireless device. The apparatus reports the interference at the first wireless device to the control node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
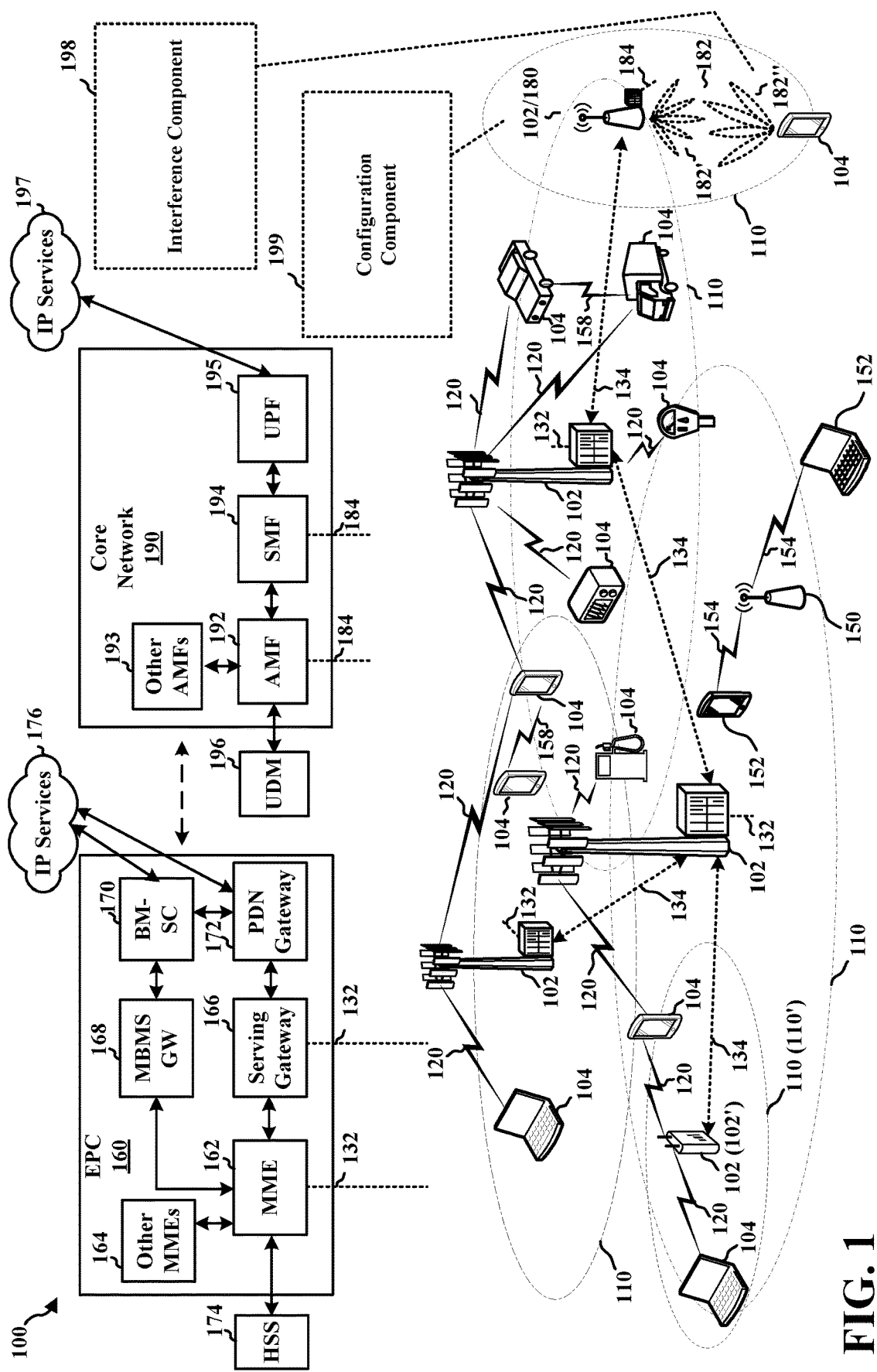
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the first wireless device (e.g., UE 104) may be configured to measure interference at the first wireless device based on a measurement configuration. For example, the first wireless device may comprise an interference component 198 configured to measure interference at the first wireless device based on a measurement configuration. The first wireless device may receive, from a control node (e.g., base station 180), a measurement configuration to measure interference. The measurement configuration comprising a first measurement occasion and a second measurement occasion. The first wireless device may measure interference at the first wireless device based on the measurement configuration. The first wireless device communicates with a second wireless device via a relay node that relays transmissions between the first wireless device and the second wireless device. The first wireless device may report the interference at the first wireless device to the control node (e.g., base station 180).

Referring again to FIG. 1, in certain aspects, the control node (e.g., base station 180) may be configured to transmit a measurement configuration to measure interference. For example, the control node may comprise a configuration component 199 configured to transmit a measurement configuration to measure interference. The control node may transmit, to a first wireless device (e.g., UE 104), a measurement configuration to measure interference. The measurement configuration comprising a first measurement occasion and a second measurement occasion. The control node may receive, from the first wireless device, a report of measured interference at the first wireless device based on the measurement configuration. Part of the measured interference under the first measurement occasion is based at least on transmissions forwarded by a relay node.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (B R), a power headroom report (PHR), and/or UCI.

Figure 3:
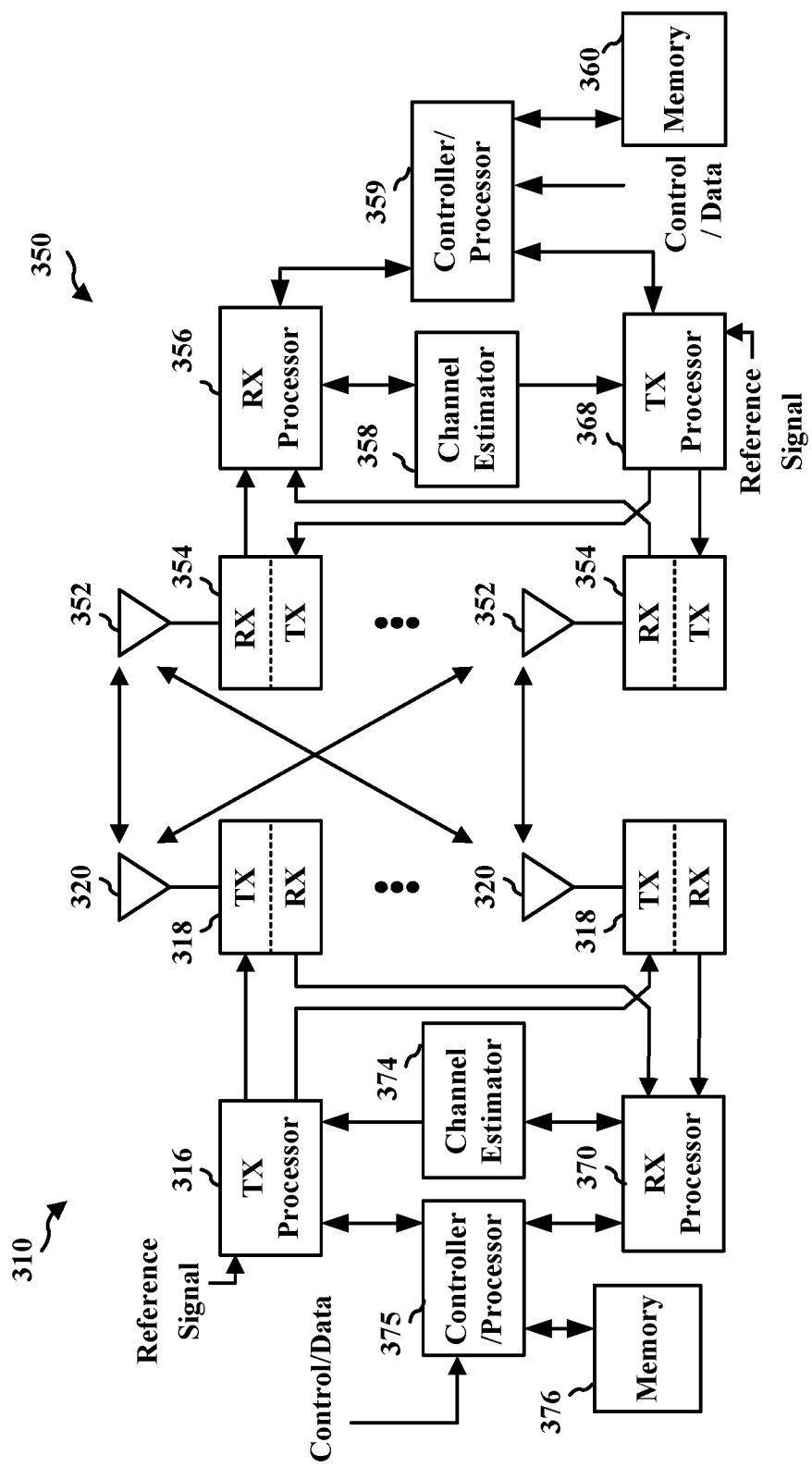
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, repeaters may be used to extend network coverage. A repeater may comprise a relay node with amplification and forwarding operation between two wireless nodes, such as between a base station and a UE. Repeaters may be a simple and cost-effective manner to improve network coverage. Some repeaters, such as IAB-nodes, may operate as a decode-and-forward relay node where minimal processing on the incoming signal is performed and amplify and forward the incoming signal. Repeaters may be sufficient to extend coverage and maybe overcome physical blockage of signals in many cases.

Side information may be provided at the repeater in order to improve the performance of a repeater. For example, timing information (e.g., slot, symbol, subframe, frame boundary), time division duplexing (TDD) uplink/downlink configuration, ON-OFF scheduling, spatial information for beam management. This side information may assist repeaters to process the incoming signal and amplify the power of the signal using beamforming. Some repeaters may be configured to be autonomous smart repeaters where the repeater itself acquires or determines at least part of the side information. For example, an autonomous smart repeater may acquire the information by receiving/decoding broadcast channels. A network controlled repeater may be configured/controlled with side information by a network node (e.g., base station) via an established control interface. For example, all the side information may be provided/controlled by the base station. In some instances, part of the side information may be configured/controlled by the base station, while the remaining side information may be acquired/determined by the repeater itself. This may allow for a reduced overhead and/or latency.

Figure 4:
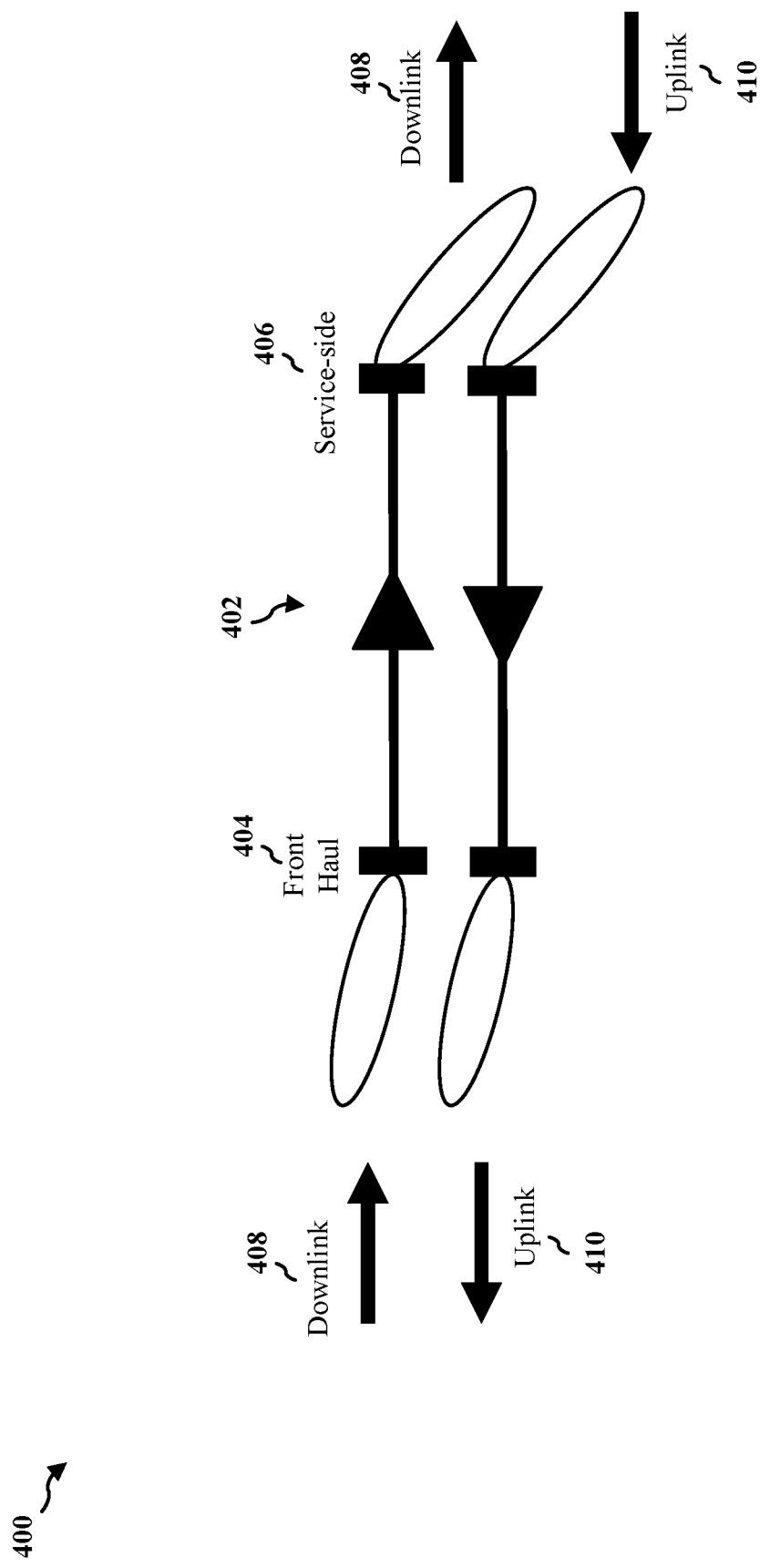
FIG. 4 illustrates an example of bidirectional forwarding of a relay node.

FIG. 4 is a diagram 400 of bidirectional forwarding of a repeater. The diagram 400 includes a repeater 402 having a front haul 404 and a service-side 406. The repeater 402 may receive a downlink signal 408 and amplify and forward the downlink signal 408. The repeater 402 may receive an uplink signal 410 and amplify and forward the uplink signal 410. The repeater may have multiple antenna arras and multiple RF/IF amplification chains. The repeater 402 may simultaneously forward signals in multiple directions (e.g., simultaneous uplink and downlink forwarding). In instances of full duplex or dynamic TDD operation, the repeater 402 may be used to forward both uplink and downlink signals simultaneously.

Figure 5:
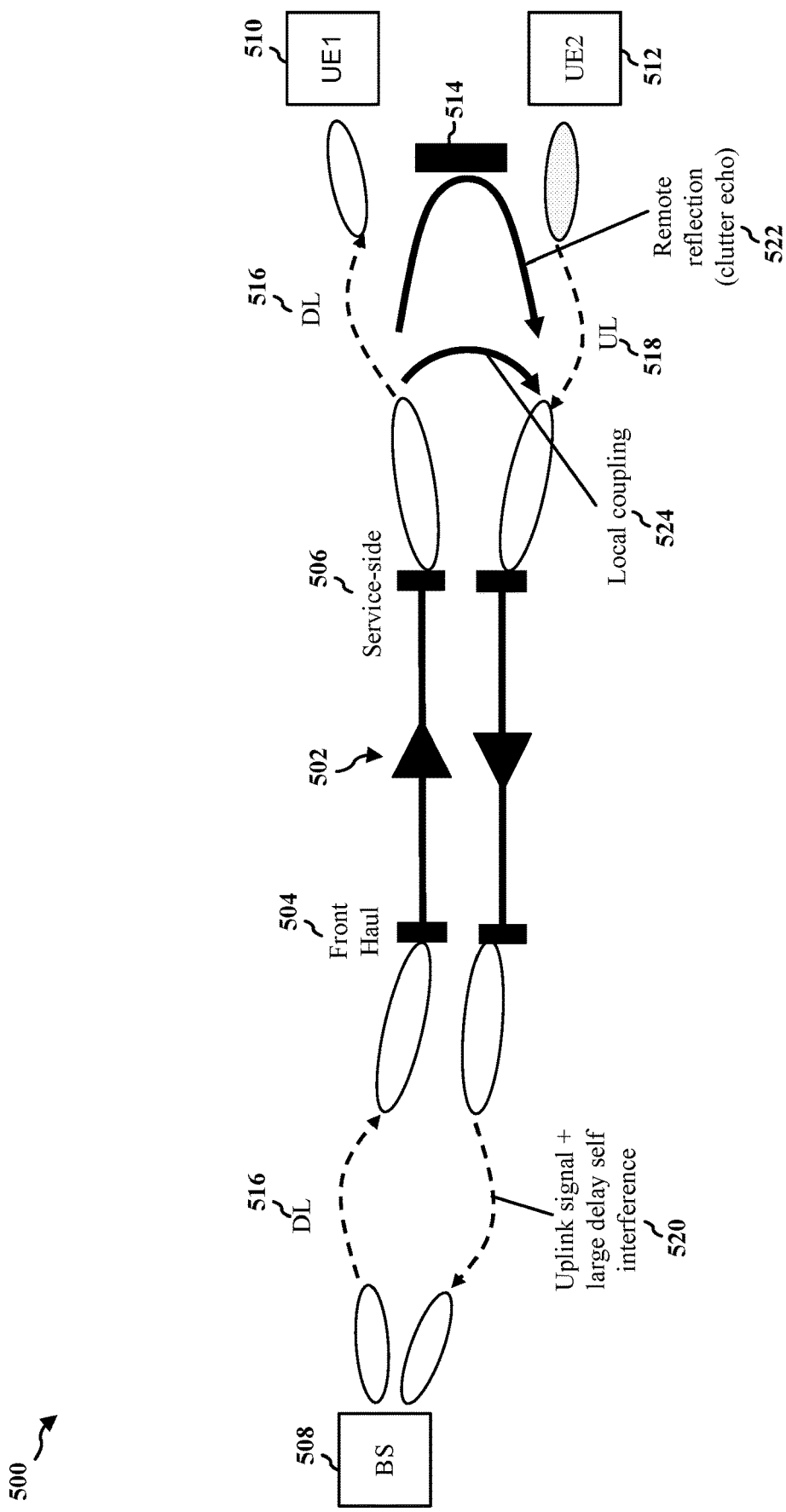
FIG. 5 illustrates an example of interference related to bidirectional forwarding of a relay node.

FIG. 5 is a diagram 500 of bidirectional forwarding of a repeater and interference. The diagram 500 includes a repeater 502 having a front haul 504 and a service-side 506. The diagram 500 includes a base station 508, a first UE 510, and a second UE 512. The bidirectional forwarding operation of the repeater 502 may lead to different interference components. For example, the base station 508 may be communicating with UE1 510 and UE2 512 via the repeater 502. The base station 508 may transmit a downlink signal 516 that is received by the repeater 502, which may process and amplify the signal and transmit the downlink signal 516 to UE1 510. In some instances, the UE2 512 may transmit an uplink signal 518 towards the repeater 502 to be amplified and transmitted to the base station 508. However, the repeater 502, while transmitting the downlink signal 516 to UE1 510, may receive part of the downlink signal 516 at the receiver of the repeater 502, such that the received portion of the downlink signal 516 may be amplified and transmitted to the base station 508. The repeater 502 may receive part of the downlink signal 516 due to local coupling 524 at the service-side 506 of the repeater 502. Local coupling 524 may occur between the receiver ports and the transmitter ports of the repeater 502. In some instances, the repeater 502 may receive part of the down link signal 516 due to a remote reflection from a reflective object 514. The downlink signal 516 may be transmitted over the air where it may be reflected by the reflective object 514 such that the downlink signal 516 is reflected back towards the repeater 502. In such instances, the reflected signal may be received by the repeater 502 amplified and transmitted to the base station 508. The uplink signal 520 that is transmitted by the repeater 502 to the base station 508 may include the uplink signal 518 from UE2 512 as well as interference due to local coupling 524 and/or the remote reflection 522. The interference included in the uplink signal 520 may comprise a self interference signal having a large time delay. The self interference signal may have the large time delay due to the downlink signal 516 being forwarded back to the base station 508 by the repeater 502. The large time delay may be based on propagation delay in the transmission of the downlink signal 516 to the repeater 502 and then forwarded back to the base station 508. The large time delay may also be based on processing delays at the repeater 502 in the processing of the local coupling 524 and/or the remote reflection 522. The base station 508, upon receipt of the uplink signal 520, may determine that the uplink signal 520 comprises part of the downlink signal 516 that the base station 508 transmitted, but with a greater time delay, than if there was local coupling at the base station 508 itself.

Figure 6:
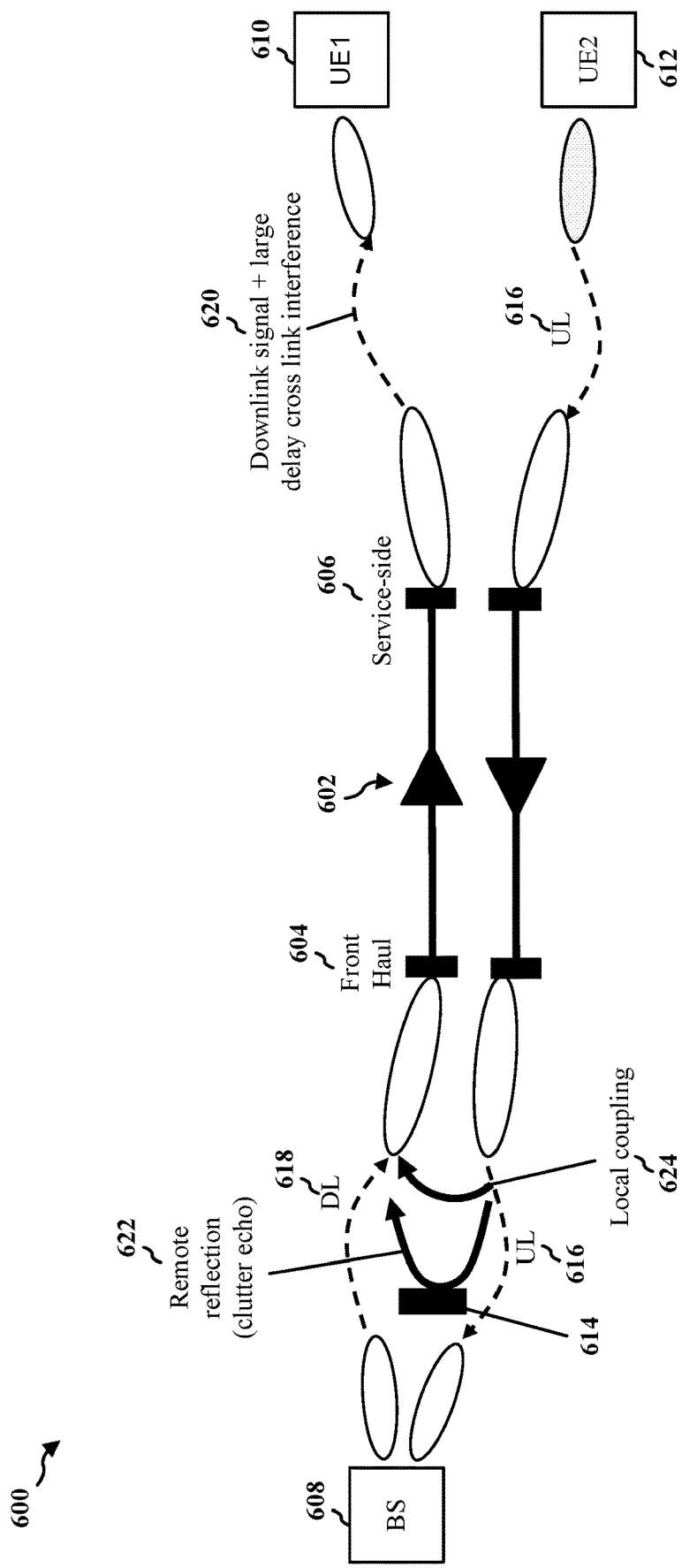
FIG. 6 illustrates an example of interference related to bidirectional forwarding of a relay node.

FIG. 6 is a diagram 600 of bidirectional forwarding of a repeater and interference. The diagram 600 includes a repeater 602 having a front haul 604 and a service-side 606. The diagram 600 includes a base station 608, a first UE 610, and a second UE 612. The bidirectional forwarding operation of the repeater 602 may lead to different interference components. For example, the base station 608 may be communicating with UE1 610 and UE2 612 via the repeater 602. The UE2 612 may transmit an uplink signal 616 that is received by the repeater 602 and is amplified and transmitted to the base station 608. In some instances, the base station 608 may transmit a downlink signal 618 towards the repeater 602 that is amplified and transmitted to UE1 610. However, the repeater 602, while transmitting the uplink signal 616 to the base station 608, may receive part of the uplink signal 616 at the receiver of the repeater 602, such that the received portion of the uplink signal 616 may be amplified and transmitted to UE1 610. The repeater 602 may receive part of the uplink signal 616 due to local coupling 624 and/or remote reflection 622 due to a reflective object 614, as discussed above in the diagram 500 of FIG. 5. The downlink signal 620 that is transmitted by the repeater 602 to UE1 610 may include the downlink signal 618 from the base station 608 as well as interference due to local coupling 624 and/or the remote reflection 622. The interference included in the downlink signal 620 may comprise a cross link interference signal having a large time delay. The cross link interference signal may have the large time delay due to the uplink signal 616 being forwarded to UE1 610. The large time delay may be based on propagation delay and/or processing delays at the repeater, as discussed in FIG. 5. UE1 610, upon receipt of the downlink signal 620, may experience cross link interference from the uplink signal 616 transmitted by UE2 even if UE1 610 and UE2 612 are not close to each.

The large delay in the self interference, which may be due to remote reflections, may also be called clutter echo. Clutter echo may be mitigated using different techniques. For example, a sufficient amount of self interference measurements may be used to identify the clutter echo. To mitigate the issue, the transmission power of the self interference signal and/or the desired signal may be adjusted to meet the desired SINR. A pair of transmission and reception beams that have a reduced amount or no self interference may be found. Transmission and reception beams may be reshaped (e.g., null forming) to suppress side lobes that may excite clutter echo. The forwarded self interference signal by the repeater may appear like a large delay self interference (e.g., clutter echo) to the wireless device (e.g., base station). However, the characteristics of the large delay self interference and management may be different from typical (e.g., passive) reflections by the environment.

Aspects provided herein provide a configuration for self interference and cross link interference management of bidirectional smart repeaters. For example, a control node may provide a measurement configuration to a first wireless device, such that the first wireless device may measure interference at the first wireless device at a first measurement occasion and at a second measurement occasion in order to identify interference due to a repeater. The first wireless device may report, to the control node, the measured interference, such that the control node may provide the repeater with an operation configuration to adjust the forwarding operation of the relay.

Figure 7:
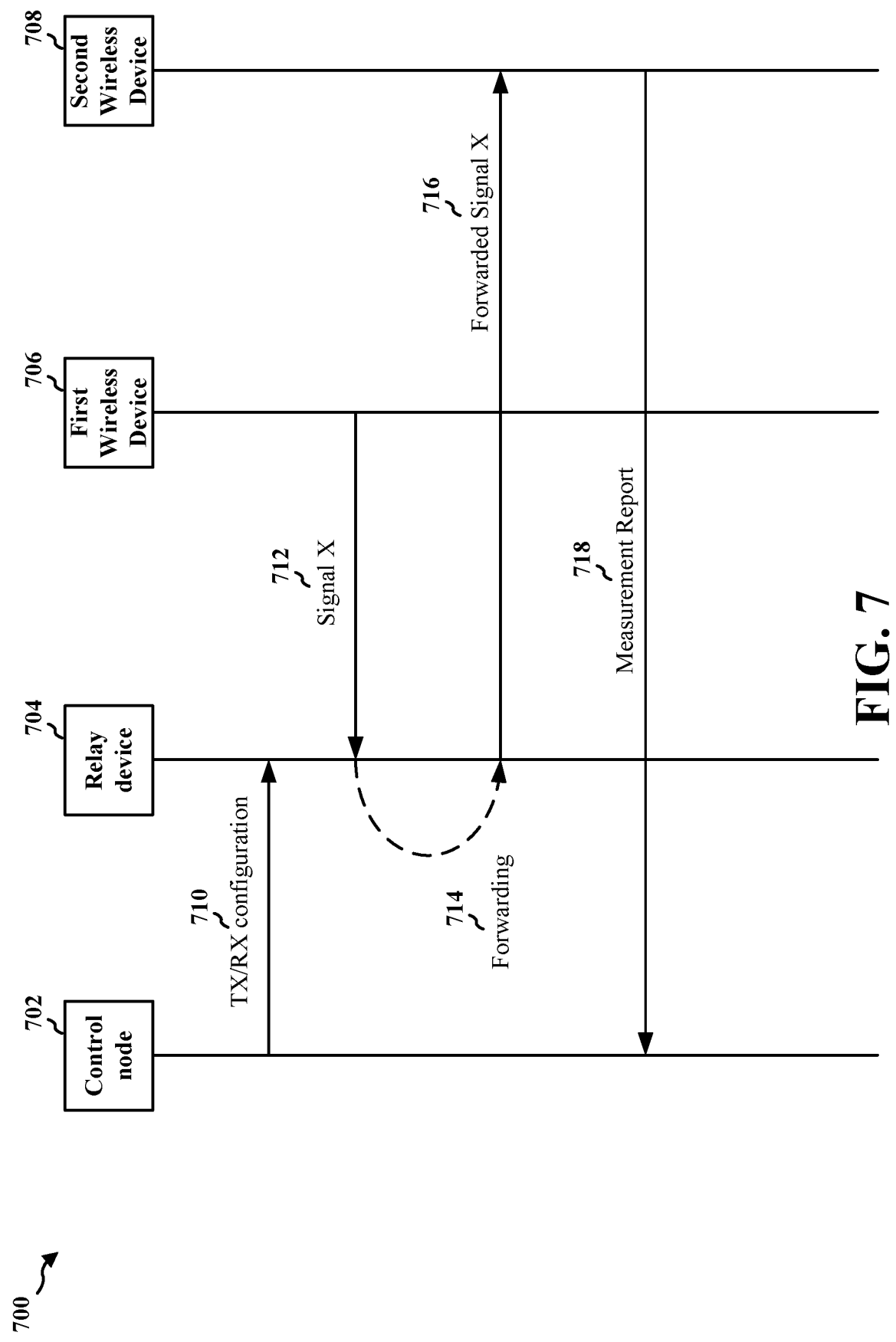
FIG. 7 illustrates an example of remote interference measurement.

FIG. 7 is a diagram 700 of remote interference measurements. The diagram 700 includes a control node 702, a relay device 704, a first wireless device 706, and a second wireless device 708. The control node 702 may comprise a base station or a UE. The control node 702 may configure bidirectional forwarding of the relay device 704. For example, the control node 702 may provide a TX/RX configuration 710 that configures the forwarding of the relay device 704. The TX/RX configuration 710 may also configure pairs of transmission/reception beams and power settings at the relay device 704. The wireless devices (e.g., first wireless device 706 or second wireless device 708) may conduct the interference measurements. In some aspects, the first wireless device 706 may be in communication with the second wireless device 708, but the first and second wireless device may utilize the relay device 704 to communicate with each other, due to network coverage or physical objects preventing communication between the first and second wireless devices. In some aspects, the first wireless device 706 may comprise a base station or a UE. In some aspects, the second wireless device 708 may comprise a base station or a UE.

The first wireless device 706 may transmit a signal X 712 to the second wireless device 708, and the signal X 712 may be received by the relay device 704. The relay device 704 may, at 714, process and forward the signal X 712 to the second wireless device 708. The relay device 704 may transmit the forwarded signal X 716 to the second wireless device 708. The forwarded signal X 716 comprises the signal X 712, but has been processed and amplified by the relay device 704 to produce the forwarded signal X 716. The second wireless device 708 may perform interference measurements received with the forwarded signal X 716. The second wireless device 708 may transmit a measurement report 718 to the control node 702 to report the measured interference at the second wireless device 708. The control node 702 may utilize the measurement report 718 to update the TX/RX configuration 710 and transmit an updated TX/RX configuration 710 to the relay device 704. The TX/RX configuration 710 may adjust the forwarding operation of the relay device 704 in an effort to minimize or eliminate the interference forwarded by the relay device 704.

Figure 8:
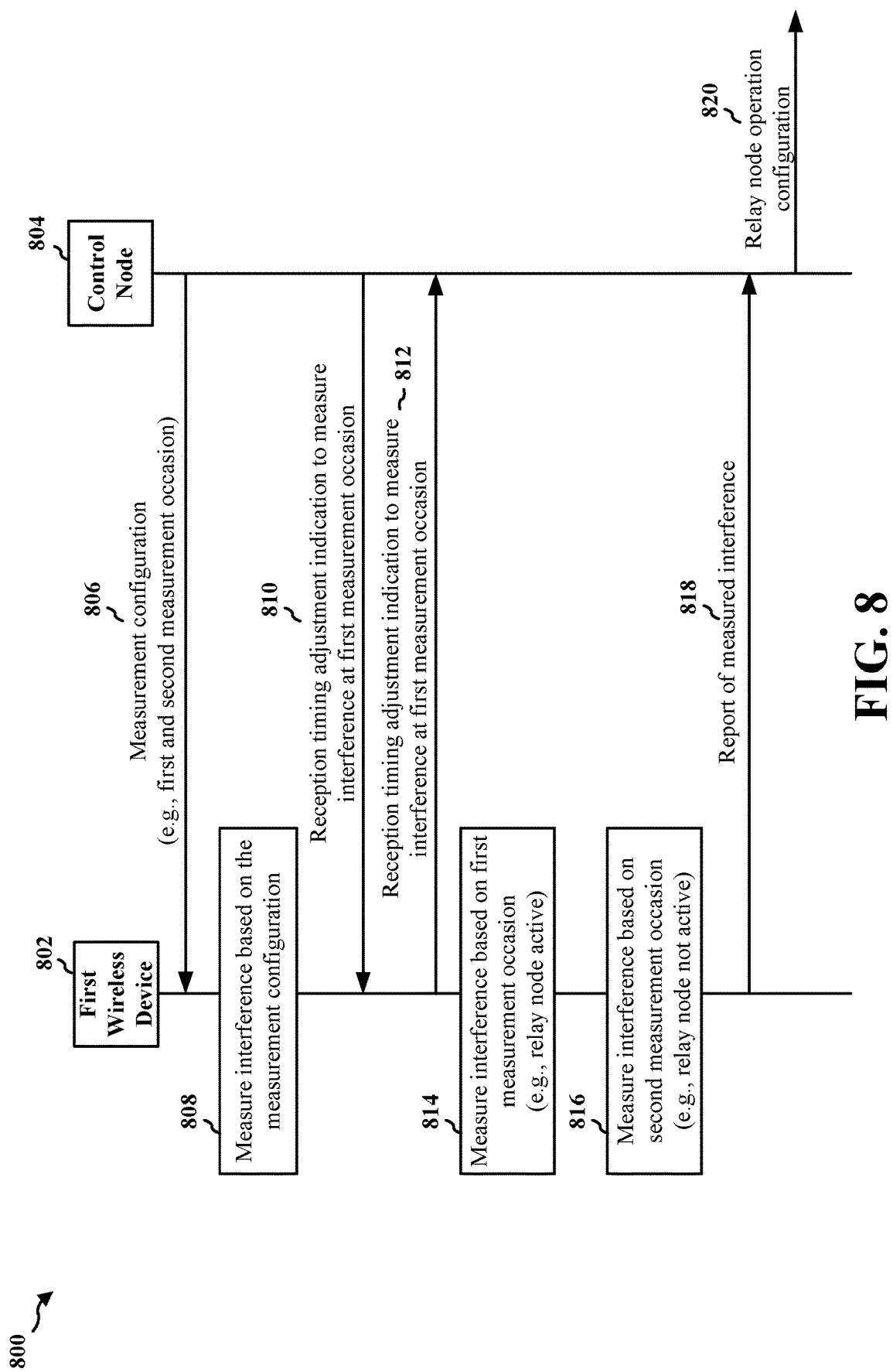
FIG. 8 is a call flow diagram of signaling between a control node and a first wireless device.

FIG. 8 is a call flow diagram 800 of signaling between a first wireless device 802 and a control node 804. The first wireless device 802 may be configured to communicate with the control node 804. The first wireless device 802 may comprise a UE. The control node 804 may comprise a base station. In some aspects, the control node 804 may comprise a UE. For example, in the context of FIG. 1, the control node 804 may correspond to base station 102/180 that provides a cell including a geographic coverage area 110 in which communication coverage is provided and/or small cell 102' having a coverage area 110'. Further, a first wireless device 802 may correspond to at least UE 104. In another example, in the context of FIG. 3, the control node 804 may correspond to base station 310 and the first wireless device 802 may correspond to UE 350.

As illustrated at 806, the control node 804 may transmit a measurement configuration to measure interference. The control node 804 may transmit the measurement configuration to measure interference to the first wireless device 802. The first wireless device 802 may receive the measurement configuration from the control node 804. The measurement configuration may comprise a first measurement occasion and a second measurement occasion. The measurement configuration may configure the first wireless device 802 to measure interference at the first measurement occasion and at the second measurement occasion. The first wireless device may be configured to measure interference at the first measurement occasion and the second measurement occasion based on the measurement configuration. The measurement configuration may comprise a notification to notify the first wireless device that the first measurement occasion is associated with an active relay node, and that the second measurement occasion is associated with a deactivated relay node. The notification indicating that the relay node is active or deactivated may allow the first wireless device to configure its further communications accordingly.

As illustrated at 808, the first wireless device 802 may measure interference at the first wireless device based on the measurement configuration. The first wireless device may communicate with a second wireless device (not shown) via a relay node (not shown). The relay node may relay transmissions between the first wireless device and the second wireless device. The first wireless device may measure interference at the first wireless device based on the first measurement occasion and based on the second measurement occasion. In the first measurement occasion, the first wireless device may measure interference that is forwarded to the first wireless device by the relay node. The relay node may forward interference to the first wireless device in instances where the first wireless device is communicating with the second wireless device. For example, the first wireless device may transmit a signal to the relay node, which may relay the signal to the second wireless device. In some instances, the signal relayed to the second wireless device may be reflected back to the relay, or the receiver of the relay node may receive part of the signal transmitted by the transmitter of the relay node when relaying the signal to the second wireless device, due to local coupling at the relay node. In such instances, the signal reflected back to the relay node or received at the relay node due to local coupling may be relayed or transmitted by the relay node to the first wireless device, which may result in self interference at the first wireless device. However, this self interference may include a large time delay due to the signal being relayed by the relay node. In some aspects, the second wireless device may communicate with a base station via the relay node, while the first wireless device may also communicate with the base station via the relay node. The second wireless device may transmit a signal to base station via the relay node, the receiver at the relay node may receive part of the signal from the second wireless device relayed to the base station, due to local coupling at the relay node or due to the signal being reflected back to the relay node. In such instances, the signal reflected back to the relay node or received at the relay node due to local coupling may be relayed or transmitted by the relay node to the first wireless device, which may result in cross link interference at the first wireless device. However, this cross link interference may include a large time delay due to the signal being relayed by the relay node.

As illustrated at 810, the control node 804 may transmit an indication to adjust a reception timing to measure the interference based on the first measurement occasion. The control node 804 may transmit the indication to adjust the reception timing to the first wireless device 802. The first wireless device 802 may receive the indication to adjust the reception timing from the control node 804. In some aspects, the indication to adjust the reception timing may comprise a timing reference or a window. The indication may account for a propagation delay of a forwarded interference signal. The forwarded interference signal may have a large delay due, in part, to propagation delays between the relay node and the wireless devices, a forwarding latency at the relay node, and in instances of a signal reflected back to the relay node (e.g., clutter echo) the round trip time (RTT) between the relay node and the reflecting object. The indication to adjust the reception timing may allow for precise measurements of interference. As such, the first wireless device 802 may be configured or indicated to adjust the reception timing to measure the interference during the first measurement occasion. In some instances, the control node 804 may have information related to some or all of the delay components and provide a reception timing reference or a reception window for the first wireless device 802 to measure interference due to the relay node.

As illustrated at 812, the first wireless device 802 may determine the adjustment to the reception timing to measure the interference based on the first measurement occasion. In some aspects, the control node may indicate in the indication to adjust a reception timing that in one set (e.g., the first measurement occasion) that the first wireless device may adjust the timing and allow the first wireless device to determine the adjustment to the reception timing to measure the interference based on the first measurement occasion. The first wireless device 802 may report the reception timing adjustment to measure the interference based on the first measurement occasion. The first wireless device 802 may report the reception timing adjustment to the control node 804. The control node 804 may receive the report of the reception timing adjustment from the first wireless device 802.

As illustrated at 814, the first wireless device 802, to measure the interference based on the first measurement occasion, may measure the interference at the first wireless device while the relay node is active. The interference while the relay node is active may comprise a forwarded interference signal (e.g., local coupling or clutter echo). In some aspects, the forwarded interference signal may be received by the relay node and relayed to the first wireless device. The forwarded interference signal may comprise self-interference relayed to the first wireless device. In some aspects, the self-interference may comprise a clutter echo due to a remote reflection caused by a reflective object back to the relay node (e.g., service side or fronthaul). In some aspects, the self-interference may comprise local coupling at the relay node. In some aspects, the forwarded interference signal may comprise cross link interference received by the relay node from the second wireless device and relayed to the first wireless device. The cross link interference may comprise a clutter echo due to a remote reflection caused by a reflective object back to the relay node. In some aspects, the cross link interference may comprise local coupling at the relay node.

As illustrated at 816, the first wireless device 802, to measure the interference based on the second measurement occasion, may measure the interference at the first wireless device while the relay node is deactivated. The interference while the relay node is deactivated may comprise an interference signal directly received by the first wireless device. The first wireless device may measure the interference at the first wireless device while the relay node is deactivated in order to measure the interference directly received by the first wireless device and differentiate from the interference measured at the first wireless device forwarded by the relay node. The interference measured during the second measurement occasion may be a component of the interference at the first wireless device that is separate from the interference forwarded to the first wireless device by the relay node. As such, the first wireless device may differentiate between forwarded interference and local interference directly received by the first wireless device. Detecting the different components of the interference measured at the first wireless device may allow for the different component (e.g., forwarded interference or local interference) to be managed differently. For example, the network may be configured to mitigate or control the forwarded interference forwarded by the relay node. The interference signal directly received by the first wireless device may comprise self-interference or cross link interference.

As illustrated at 818, the first wireless device 802 may report the interference at the first wireless device based on the measurement configuration. The first wireless device may report the interference at the first wireless device to the control node. The control node may receive the report of the interference from the first wireless device. In some aspects, the report may comprise a request to deactivate the relay node. In some instances, the measured interference during the first measurement occasion (e.g., active relay node) may exceed a threshold, such that the first wireless device may indicate that the relay node is causing an issue and should be deactivated.

As illustrated at 820, the control node 804 may transmit an operation configuration to adjust a forwarding operation of the relay node. The control node may transmit the operation configuration to the relay node. The control node may transmit the operation configuration to adjust the forwarding operation of the relay node based on the report of the measured interference at the first wireless device. In some aspects, the control node 804 may deactivate the relay node in response to receiving the report indicating that the relay node is causing an issue and should be deactivated.

Figure 9:
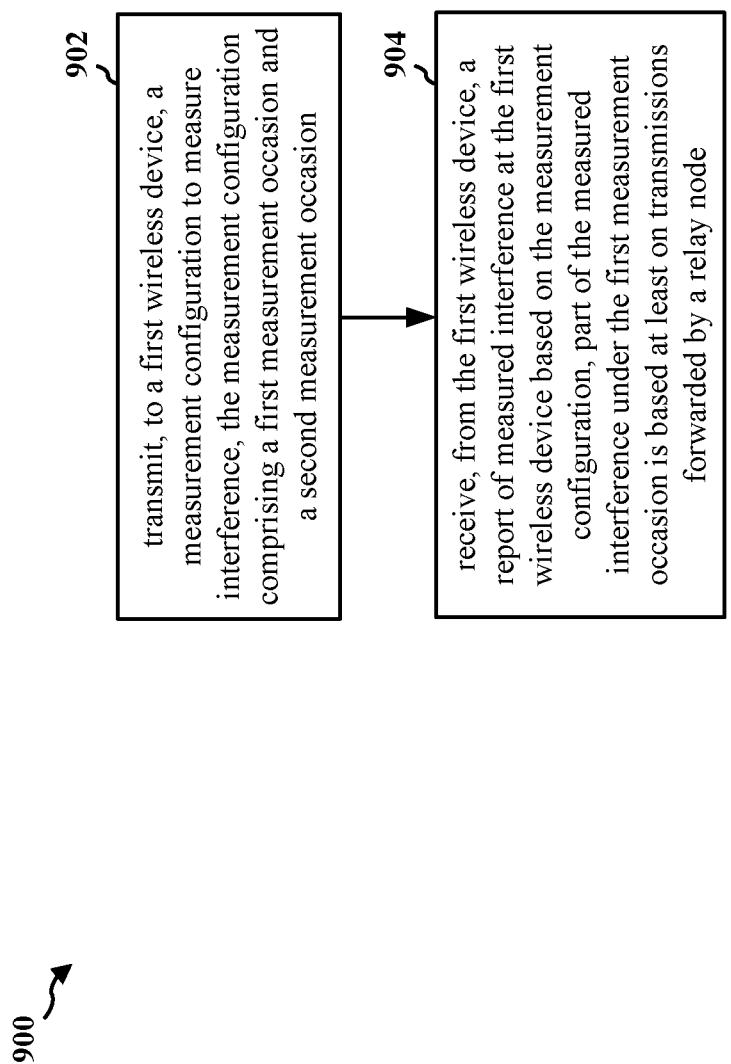
FIG. 9 is a flowchart of a method of wireless communication.

FIG. 9 is a flowchart 900 of a method of wireless communication. The method may be performed by a control node or a component of a control node (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a control node to configure a first wireless device with an interference measurement configuration to determine forwarded interference due to a relay device and local interference received at the first wireless device.

At 902, the control node may transmit a measurement configuration to measure interference. For example, 902 may be performed by configuration component 1440 of apparatus 1102. The control node may transmit the measurement configuration to measure interference to a first wireless device. The measurement configuration may comprise a first measurement occasion and a second measurement occasion. The measurement configuration may configure the first wireless device to measure interference at the first measurement occasion and at the second measurement occasion. The measurement configuration may comprise a notification to notify the first wireless device that the first measurement occasion is associated with an active relay node, and that the second measurement occasion is associated with a deactivated relay node. The notification indicating that the relay node is active or deactivated may allow the first wireless device to configure its further communications accordingly. In the context of FIG. 8, the control node 804, at 806, may transmit a measurement configuration to the first wireless device 802.

At 904, the control node may receive a report of measured interference at the first wireless device based on the measurement configuration. For example, 904 may be performed by report component 1144 of apparatus 1102. The control node may receive the report of measured interference at the first wireless device based on the measurement configuration from the first wireless device. Part of the measured interference under the first measurement occasion may be based at least on transmissions forwarded by a relay node. In some aspects, the measured interference under the first measurement occasion may comprise interference measurements while the relay node is active. The interference while the relay node is active may comprise a forwarded interference signal. The forwarded interference signal may be received by the relay node and relayed to the first wireless device. In some aspects, the forwarded interference signal may comprise self-interference relayed to the first wireless device. The self-interference may comprise a clutter echo due to a remote reflection or a local coupling at the relay node. In some aspects, the forwarded interference signal may comprise cross link interference received by the relay node from a second wireless device and relayed to the first wireless device by the relay node. The cross link interference may comprise a clutter echo due to a remote reflection or a local coupling at the relay node. In some aspects, the measured interference under the second measurement occasion may comprise interference measurements while the relay node is deactivated. The interference measured while the relay node is deactivated may comprise an interference signal directly received by the first wireless device, such that the relay node does not relay an interference signal to the first wireless device. The measured interference under the second measurement occasion may differentiate the forwarded interference relayed by the relay node and local interference received by the first wireless device. In some aspects, the interference signal directly received by the first wireless device may comprise self-interference or cross link interference. In some aspects, the report may comprise a request to deactivate the relay node. In some instances, the measured interference during the first measurement occasion (e.g., active relay node) may exceed a threshold, such that the first wireless device may indicate that the relay node is causing an issue and should be deactivated. In the context of FIG. 8, the control node 804, at 818, may receive a report of measured interference.

Figure 10:
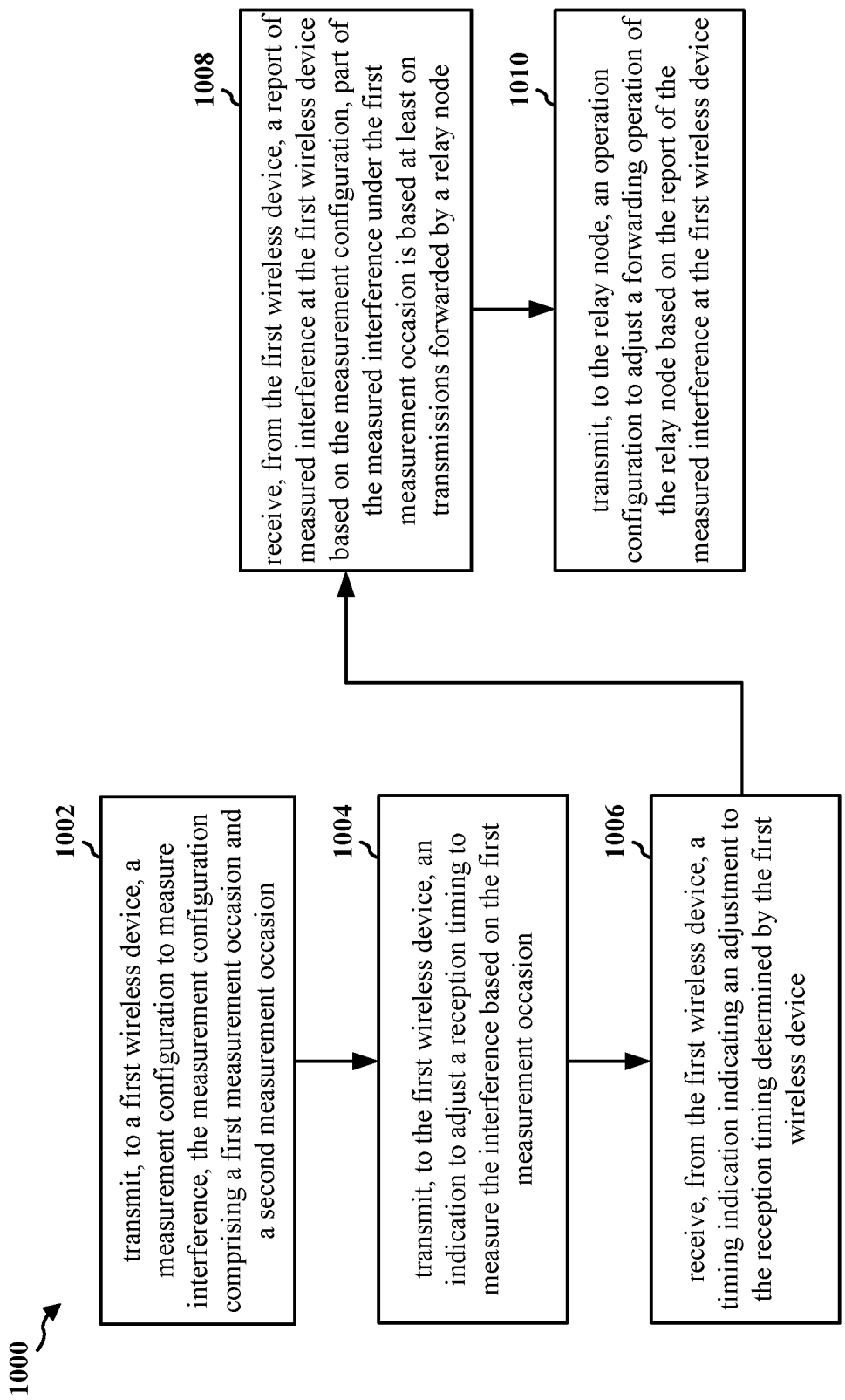
FIG. 10 is a flowchart of a method of wireless communication.

FIG. 10 is a flowchart 1000 of a method of wireless communication. The method may be performed by a control node or a component of a control node (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a control node to configure a first wireless device with an interference measurement configuration to determine forwarded interference due to a relay device and local interference received at the first wireless device.

At 1002, the control node may transmit a measurement configuration to measure interference. For example, 1002 may be performed by configuration component 1440 of apparatus 1102. The control node may transmit the measurement configuration to measure interference to a first wireless device. The measurement configuration may comprise a first measurement occasion and a second measurement occasion. The measurement configuration may configure the first wireless device to measure interference at the first measurement occasion and at the second measurement occasion. The measurement configuration may comprise a notification to notify the first wireless device that the first measurement occasion is associated with an active relay node, and that the second measurement occasion is associated with a deactivated relay node. The notification indicating that the relay node is active or deactivated may allow the first wireless device to configure its further communications accordingly. In the context of FIG. 8, the control node 804, at 806, may transmit a measurement configuration to the first wireless device 802.

At 1004, the control node may transmit an indication to adjust a reception timing. For example, 1004 may be performed by timing adjust component 1142 of apparatus 1102. The control node may transmit the indication to adjust the reception timing to measure the interference based on the first measurement occasion. In some aspects, the indication to adjust the reception timing may comprise a timing reference or a window. The indication may account for a propagation delay of a forwarded interference signal. In the context of FIG. 8, the control node 804, at 810, may transmit an indication to adjust the reception timing to the first wireless device 802.

At 1006, the control node may receive a timing indication. For example, 1006 may be performed by timing adjustment component 1142 of apparatus 1102. The control node may receive the timing indication from the first wireless device. The control node may receive the timing indication indicating an adjustment to the reception timing determined by the first wireless device. In the context of FIG. 8, the control node 804, at 812, may receive a timing indication determined by the first wireless device 802.

At 1008, the control node may receive a report of measured interference at the first wireless device based on the measurement configuration. For example, 1008 may be performed by report component 1144 of apparatus 1102. The control node may receive the report of measured interference at the first wireless device based on the measurement configuration from the first wireless device. Part of the measured interference under the first measurement occasion may be based at least on transmissions forwarded by a relay node. In some aspects, the measured interference under the first measurement occasion may comprise interference measurements while the relay node is active. The interference while the relay node is active may comprise a forwarded interference signal. The forwarded interference signal may be received by the relay node and relayed to the first wireless device. In some aspects, the forwarded interference signal may comprise self-interference relayed to the first wireless device. The self-interference may comprise a clutter echo due to a remote reflection or a local coupling at the relay node. In some aspects, the forwarded interference signal may comprise cross link interference received by the relay node from a second wireless device and relayed to the first wireless device by the relay node. The cross link interference may comprise a clutter echo due to a remote reflection or a local coupling at the relay node. In some aspects, the measured interference under the second measurement occasion may comprise interference measurements while the relay node is deactivated. The interference measured while the relay node is deactivated may comprise an interference signal directly received by the first wireless device, such that the relay node does not relay an interference signal to the first wireless device. The measured interference under the second measurement occasion may differentiate the forwarded interference relayed by the relay node and local interference received by the first wireless device. In some aspects, the interference signal directly received by the first wireless device may comprise self-interference or cross link interference. In some aspects, the report may comprise a request to deactivate the relay node. In some instances, the measured interference during the first measurement occasion (e.g., active relay node) may exceed a threshold, such that the first wireless device may indicate that the relay node is causing an issue and should be deactivated. In the context of FIG. 8, the control node 804, at 818, may receive a report of measured interference.

At 1010, the control node may transmit an operation configuration to adjust a forwarding operation of the relay node. For example, 1010 may be performed by configuration component 1140 of apparatus 1102. The control node may transmit the operation configuration to the relay node. The control node may transmit the operation configuration to adjust the forwarding operation of the relay node based on the report of the measured interference at the first wireless device. In some aspects, the control node 804 may deactivate the relay node in response to receiving the report indicating that the relay node is causing an issue and should be deactivated. In the context of FIG. 8, the control node 804, at 820, transmit, to a relay node, an operation configuration to adjust a forwarding operation of the relay node.

Figure 11:
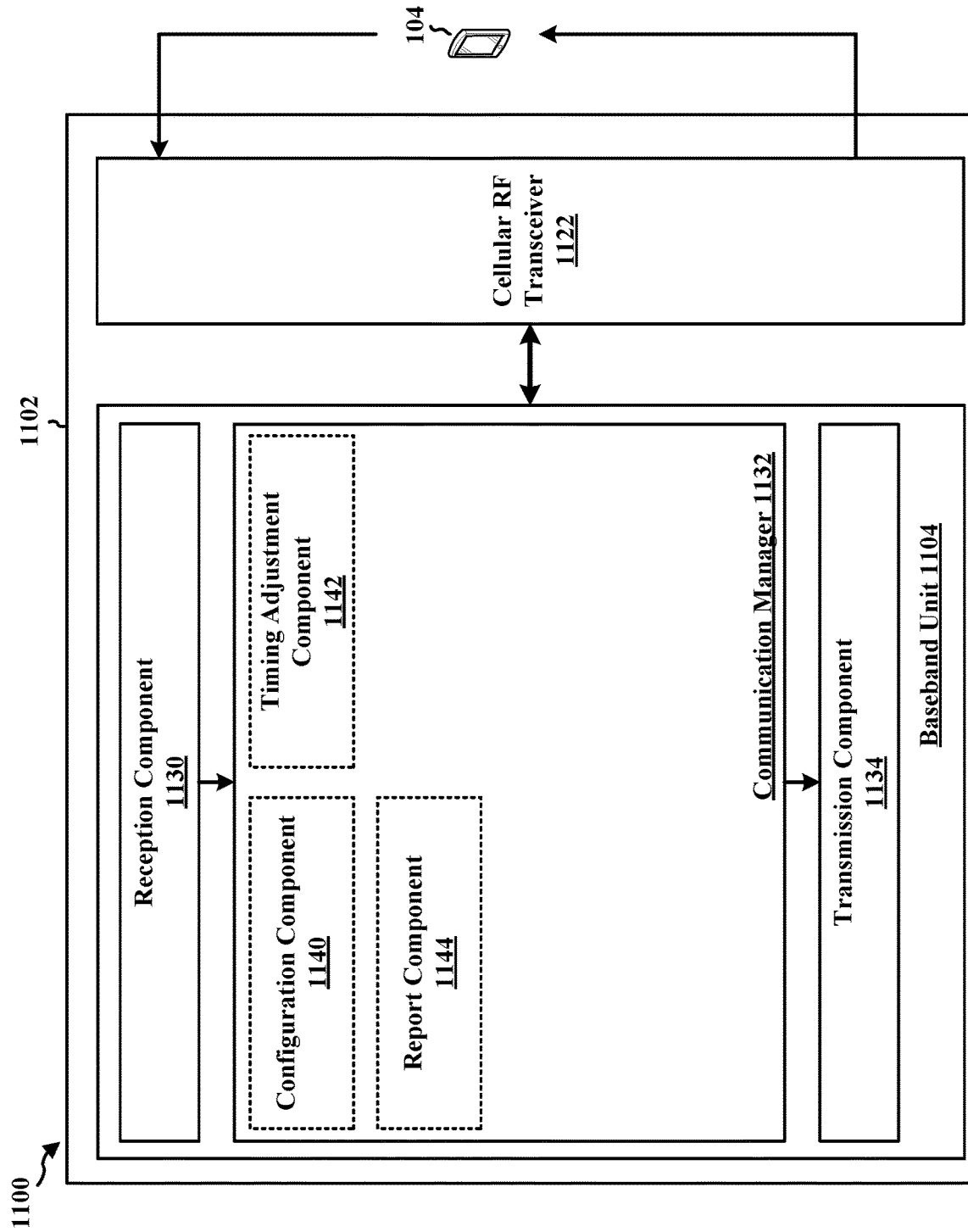
FIG. 11 is a diagram illustrating an example of a hardware implementation for an example apparatus.

FIG. 11 is a diagram 1100 illustrating an example of a hardware implementation for an apparatus 1102. The apparatus 1102 may be a control node, a component of a control node, or may implement control node functionality. In some aspects, the apparatus 1102 may comprise a base station. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a configuration component 1140 that may transmit a measurement configuration to measure interference, e.g., as described in connection with 902 of FIG. 9 or 1002 of FIG. 10. The configuration component 1140 may be configured to transmit an operation configuration to adjust a forwarding operation of the relay node, e.g., as described in connection with 1010 of FIG. 10. The communication manager 1132 further includes a timing adjustment component 1142 that may transmit an indication to adjust a reception timing, e.g., as described in connection with 1004 of FIG. 10. The timing adjustment component 1142 may be configured to receive a timing indication, e.g., as described in connection with 1006 of FIG. 10. The communication manager 1132 further includes a report component 1144 that may receive a report of measured interference at the first wireless device based on the measurement configuration, e.g., as described in connection with 904 of FIG. 9 or 1008 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a first wireless device, a measurement configuration to measure interference. The measurement configuration comprising a first measurement occasion and a second measurement occasion. The apparatus includes means for receiving, from the first wireless device, a report of measured interference at the first wireless device based on the measurement configuration. Part of the measured interference under the first measurement occasion is based at least on transmissions forwarded by a relay node. The apparatus further includes means for transmitting, to the first wireless device, an indication to adjust a reception timing to measure the interference based on the first measurement occasion. The apparatus further includes means for receiving, from the first wireless device, a timing indication indicating an adjustment to the reception timing determined by the first wireless device. The apparatus further includes means for transmitting, to the relay node, an operation configuration to adjust a forwarding operation of the relay node based on the report of the measured interference at the first wireless device. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
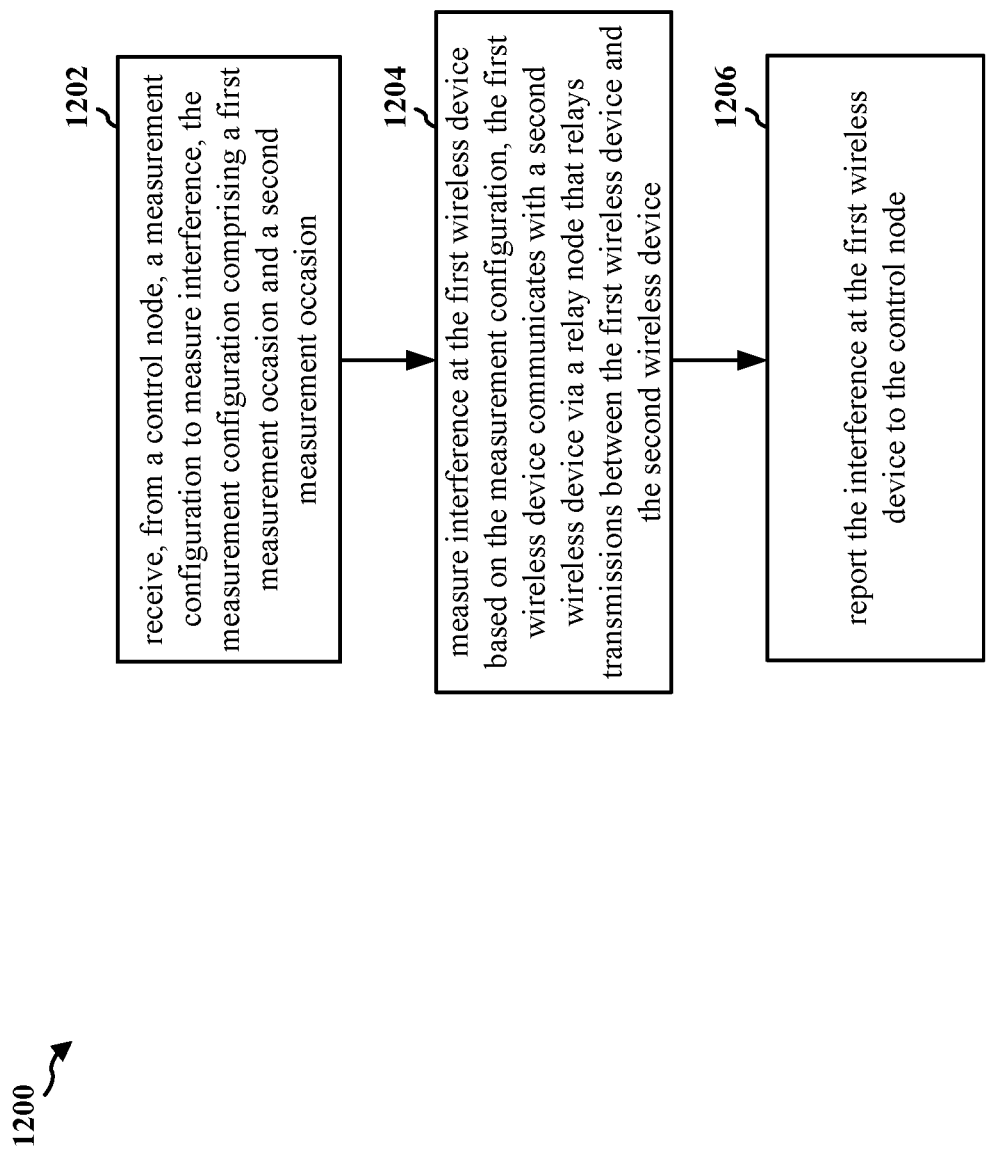
FIG. 12 is a flowchart of a method of wireless communication.

FIG. 12 is a flowchart 1200 of a method of wireless communication. The method may be performed by a first wireless device or a component of a first wireless device (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to receive an interference measurement configuration to measure forwarded interference due to a relay device and local interference received at the first wireless device.

At 1202, the first wireless device may receive a measurement configuration to measure interference. For example, 1202 may be performed by configuration component 1440 of apparatus 1402. The first wireless device may receive the measurement configuration to measure interference from a control node. The measurement configuration may comprise a first measurement occasion and a second measurement occasion. The first wireless device may be configured to measure interference at the first measurement occasion and the second measurement occasion based on the measurement configuration. The measurement configuration may comprise a notification to notify the first wireless device that the first measurement occasion is associated with an active relay node, and that the second measurement occasion is associated with a deactivated relay node. The notification indicating that the relay node is active or deactivated may allow the first wireless device to configure its further communications accordingly. In the context of FIG. 8, the first wireless device 802, at 806, may receive a measurement configuration from the control node 804.

At 1204, the first wireless device may measure interference at the first wireless device based on the measurement configuration. For example, 1204 may be performed by interference component 1442 of apparatus 1402. The first wireless device may communicate with a second wireless device via a relay node. The relay node may relay transmissions between the first wireless device and the second wireless device. In the context of FIG. 8, the first wireless device 802, at 808, may measure interference based on the measurement configuration.

At 1206, the first wireless device may report the interference at the first wireless device. For example, 1206 may be performed by report component 1446 of apparatus 1402. The first wireless device may report the interference at the first wireless device to the control node. In some aspects, the report may comprise a request to deactivate the relay node. In some instances, the measured interference during the first measurement occasion (e.g., active relay node) may exceed a threshold, such that the first wireless device may indicate that the relay node is causing an issue and should be deactivated. In the context of FIG. 8, the first wireless device 802, at 818, may report the interference at the first wireless device to the control node 804.

Figure 13:
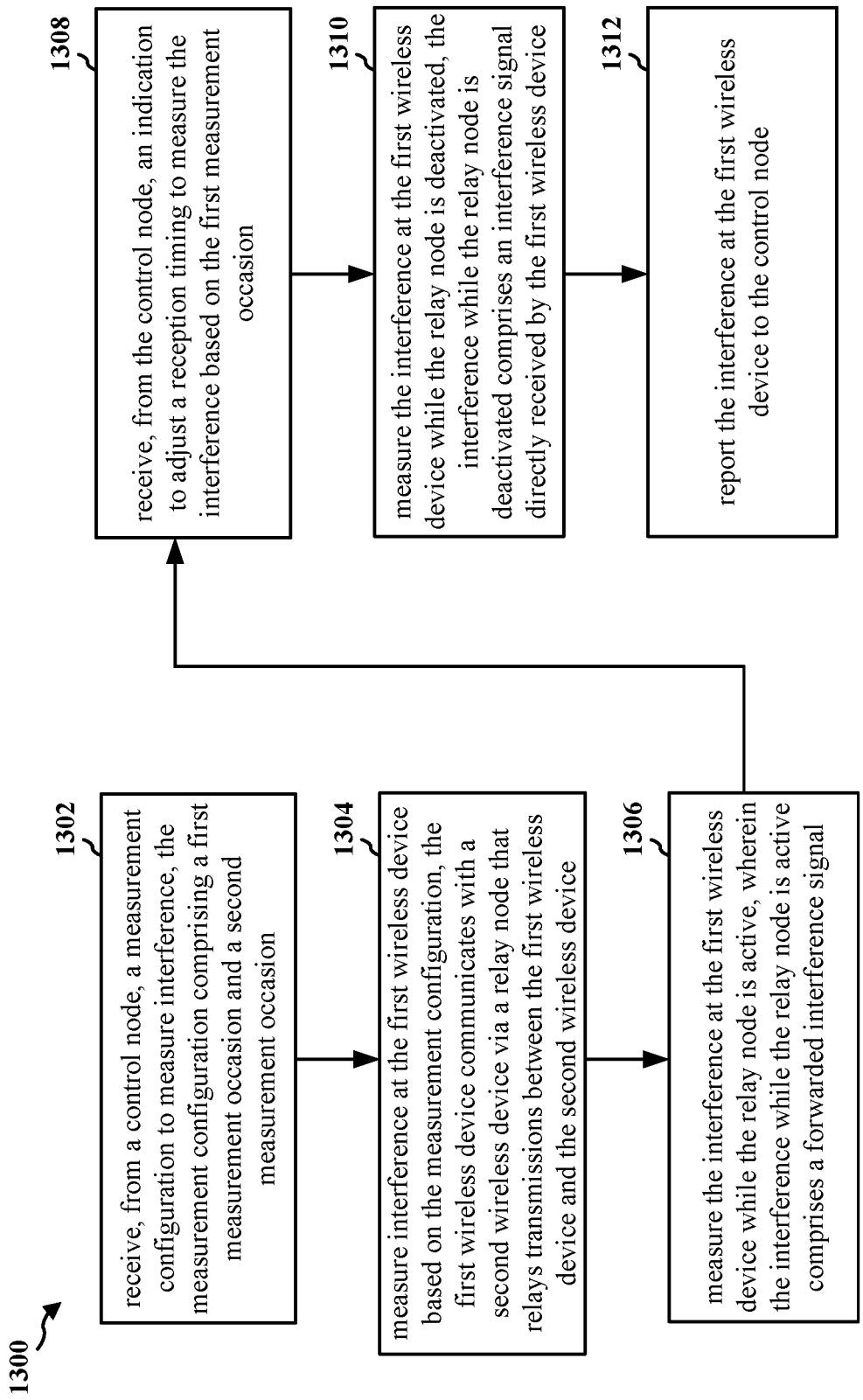
FIG. 13 is a flowchart of a method of wireless communication.

FIG. 13 is a flowchart 1300 of a method of wireless communication. The method may be performed by a first wireless device or a component of a first wireless device (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to receive an interference measurement configuration to measure forwarded interference due to a relay device and local interference received at the first wireless device.

At 1302, the first wireless device may receive a measurement configuration to measure interference. For example, 1302 may be performed by configuration component 1440 of apparatus 1402. The first wireless device may receive the measurement configuration to measure interference from a control node. The measurement configuration may comprise a first measurement occasion and a second measurement occasion. The first wireless device may be configured to measure interference at the first measurement occasion and the second measurement occasion based on the measurement configuration. The measurement configuration may comprise a notification to notify the first wireless device that the first measurement occasion is associated with an active relay node, and that the second measurement occasion is associated with a deactivated relay node. The notification indicating that the relay node is active or deactivated may allow the first wireless device to configure its further communications accordingly. In the context of FIG. 8, the first wireless device 802, at 806, may receive a measurement configuration from the control node 804.

At 1304, the first wireless device may measure interference at the first wireless device based on the measurement configuration. For example, 1304 may be performed by interference component 1442 of apparatus 1402. The first wireless device may communicate with a second wireless device via a relay node. The relay node may relay transmissions between the first wireless device and the second wireless device. In the context of FIG. 8, the first wireless device 802, at 808, may measure interference based on the measurement configuration.

At 1306, the first wireless device may measure the interference at the first wireless device while the relay node is active. For example, 1306 may be performed by interference component 1442 of apparatus 1402. The first wireless device may measure the interference at the first wireless device while the relay node is active in order to measure the interference based on the first measurement occasion. The interference while the relay node is active may comprise a forwarded interference signal. In some aspects, the forwarded interference signal may be received by the relay node and relayed to the first wireless device. The forwarded interference signal may comprise self-interference relayed to the first wireless device. In some aspects, the self-interference may comprise a clutter echo due to a remote reflection or a local coupling at the relay node. In some aspects, the forwarded interference signal may comprise cross link interference received by the relay node from the second wireless device and relayed to the first wireless device. The cross link interference may comprise a clutter echo due to a remote reflection or a local coupling at the relay node. In the context of FIG. 8, the first wireless device 802, at 814, may measure interference based on the first measurement occasion while the relay node is active.

At 1308, the first wireless device may receive an indication to adjust a reception timing to measure the interference. For example, 1308 may be performed by time adjustment component 1444 of apparatus 1402. The first wireless device may receive the indication to adjust the reception timing to measure the interference from the control node. The first wireless device may receive the indication to adjust the reception timing to measure the interference based on the first measurement occasion. In some aspects, the indication to adjust the reception timing may comprise a timing reference or a window. The indication may account for a propagation delay of the forwarded interference signal. In some aspects, the first wireless device may determine an adjustment to the reception timing and reports the adjustment to the reception timing to the control node, for example as shown at 812 of FIG. 8. In the context of FIG. 8, the first wireless device 802, at 810, may receive an indication to adjust a reception timing to measure the interference.

At 1310, the first wireless device may measure the interference at the first wireless device while the relay node is deactivated. For example, 1310 may be performed by interference component 1442 of apparatus 1402. The interference while the relay node is deactivated may comprise an interference signal directly received by the first wireless device. The first wireless device may measure the interference at the first wireless device while the relay node is deactivated in order to measure the interference based on the second measurement occasion. The interference signal directly received by the first wireless device may comprise self-interference or cross link interference. In the context of FIG. 8, the first wireless device 802, at 816, may measure interference based on the second measurement occasion while the relay node is deactivated.

At 1312, the first wireless device may report the interference at the first wireless device. For example, 1312 may be performed by report component 1446 of apparatus 1402. The first wireless device may report the interference at the first wireless device to the control node. In some aspects, the report may comprise a request to deactivate the relay node. In some instances, the measured interference during the first measurement occasion (e.g., active relay node) may exceed a threshold, such that the first wireless device may indicate that the relay node is causing an issue and should be deactivated. In the context of FIG. 8, the first wireless device 802, at 818, may report the interference at the first wireless device to the control node 804.

Figure 14:
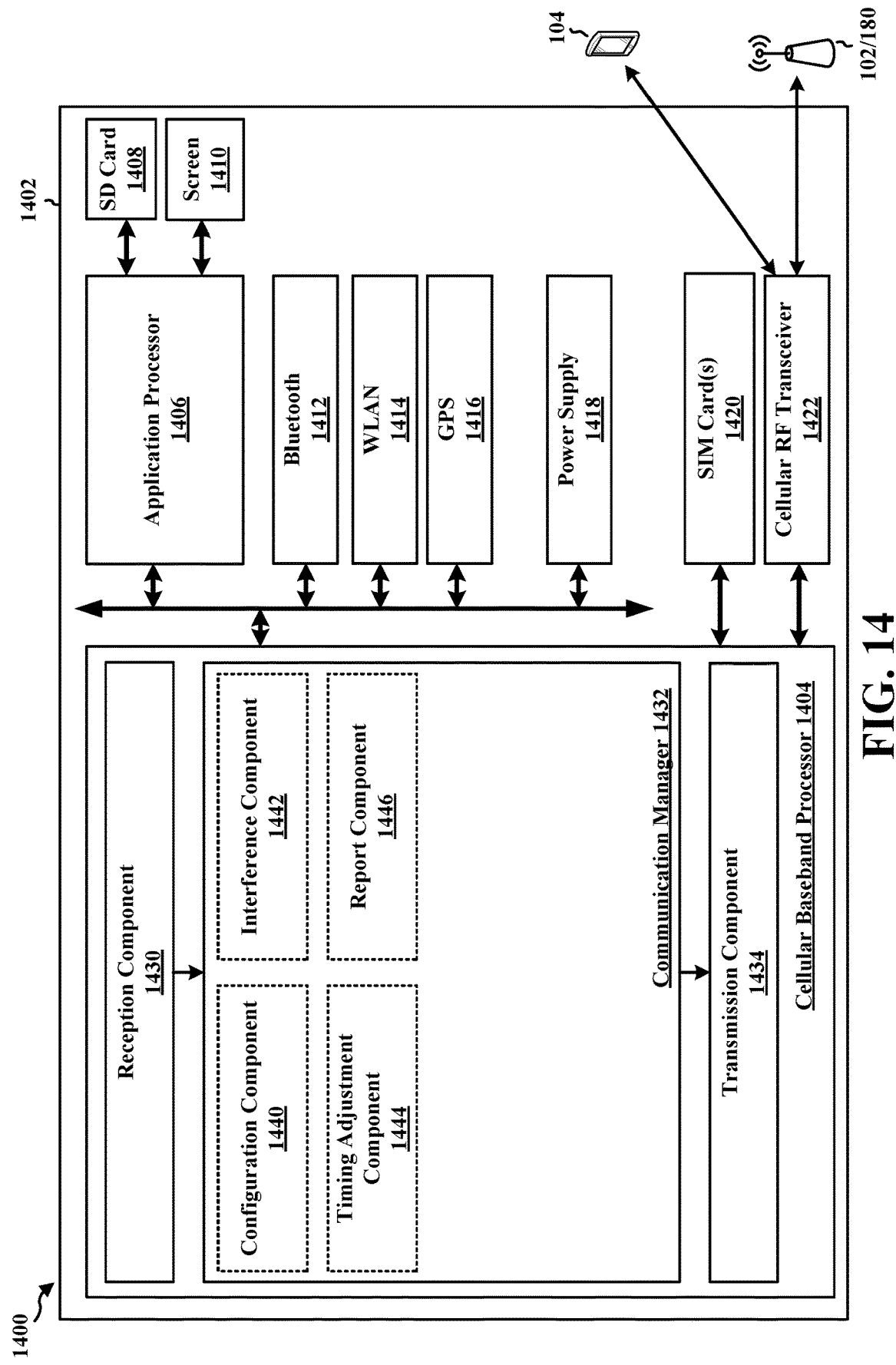
FIG. 14 is a diagram illustrating an example of a hardware implementation for an example apparatus.

FIG. 14 is a diagram 1400 illustrating an example of a hardware implementation for an apparatus 1402. The apparatus 1402 may be a first wireless device, a component of a first wireless device, or may implement first wireless device functionality. In some aspects, the apparatus 1402 may comprise a UE. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a configuration component 1440 that is configured to receive a measurement configuration to measure interference, e.g., as described in connection with 1202 of FIG. 12 or 1302 of FIG. 13. The communication manager 1432 further includes an interference component 1442 that is configured to measure interference at the first wireless device based on the measurement configuration, e.g., as described in connection with 1204 of FIG. 12 or 1304 of FIG. 13. The interference component 1442 may be configured to measure the interference at the first wireless device while the relay node is active, e.g., as described in connection with 1306 of FIG. 13. The interference component 1442 may be configured to measure the interference at the first wireless device while the relay node is deactivated, e.g., as described in connection with 1310 of FIG. 13. The communication manager 1432 further includes a timing adjustment component 1444 that is configured to receive an indication to adjust a reception timing to measure the interference, e.g., as described in connection with 1308 of FIG. 13. The communication manager 1432 further includes a report component 1446 that is configured to report the interference at the first wireless device, e.g., as described in connection with 1206 of FIG. 12 or 1312 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a control node, a measurement configuration to measure interference. The measurement configuration comprising a first measurement occasion and a second measurement occasion. The apparatus includes means for measuring interference at the first wireless device based on the measurement configuration. The first wireless device communicates with a second wireless device via a relay node that relays transmissions between the first wireless device and the second wireless device. The apparatus includes means for reporting the interference at the first wireless device to the control node. The apparatus further includes means for measuring the interference at the first wireless device while the relay node is active. The interference while the relay node is active comprises a forwarded interference signal. The apparatus further includes means for receiving, from the control node, an indication to adjust a reception timing to measure the interference based on the first measurement occasion. The apparatus further includes means for measuring the interference at the first wireless device while the relay node is deactivated. The interference while the relay node is deactivated comprises an interference signal directly received by the first wireless device. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a control node including a memory; and at least one processor coupled to the memory and configured to transmit, to a first wireless device, a measurement configuration to measure interference, the measurement configuration comprising a first measurement occasion and a second measurement occasion; and receive, from the first wireless device, a report of measured interference at the first wireless device based on the measurement configuration, wherein part of the measured interference under the first measurement occasion is based at least on transmissions forwarded by a relay node.

Aspect 2 is the apparatus of Aspect 1, further includes a transceiver coupled to the at least one processor.

Aspect 3 is the apparatus of Aspects 1 and 2, further includes that the measured interference under the first measurement occasion comprises interference measurements while the relay node is active, wherein the interference while the relay node is active comprises a forwarded interference signal.

Aspect 4 is the apparatus of Aspects 1-3, further includes that the forwarded interference signal is received by the relay node and relayed to the first wireless device.

Aspect 5 is the apparatus of Aspects 1-4, further includes that the forwarded interference signal comprises self-interference relayed to the first wireless device, wherein the self-interference comprises a clutter echo due to a remote reflection or a local coupling at the relay node.

Aspect 6 is the apparatus of Aspects 1-5, further includes that the forwarded interference signal comprises cross link interference received by the relay node from a second wireless device and relayed to the first wireless device, wherein the cross link interference comprises a clutter echo due to a remote reflection or a local coupling at the relay node.

Aspect 7 is the apparatus of Aspects 1-6, further includes that the at least one processor is further configured to transmit, to the first wireless device, an indication to adjust a reception timing to measure the interference based on the first measurement occasion.

Aspect 8 is the apparatus of Aspects 1-7, further includes that the indication to adjust the reception timing comprises a timing reference or a window, wherein the indication accounts for a propagation delay of a forwarded interference signal.

Aspect 9 is the apparatus of Aspects 1-8, further includes that the at least one processor is further configured to receive, from the first wireless device, a timing indication indicating an adjustment to the reception timing determined by the first wireless device.

Aspect 10 is the apparatus of Aspects 1-9, further includes that the measured interference under the second measurement occasion comprises interference measurements while the relay node is deactivated, wherein the interference while the relay node is deactivated comprises an interference signal directly received by the first wireless device.

Aspect 11 is the apparatus of Aspects 1-10, further includes that the interference signal directly received by the first wireless device comprises self-interference or cross link interference.

Aspect 12 is the apparatus of Aspects 1-11, further includes that the at least one processor is further configured to transmit, to the relay node, an operation configuration to adjust a forwarding operation of the relay node based on the report of the measured interference at the first wireless device.

Aspect 13 is the apparatus of Aspects 1-12, further includes that the measurement configuration comprises a notification to notify the first wireless device that the first measurement occasion is associated with an active relay node and that the second measurement occasion is associated with a deactivated relay node.

Aspect 14 is the apparatus of Aspects 1-13, further includes that the report of measured interference comprises a request to deactivate the relay node.

Aspect 15 is a method of wireless communication for implementing any of Aspects 1-14.

Aspect 16 is an apparatus for wireless communication including means for implementing any of Aspects 1-14.

Aspect 17 is a computer-readable medium storing computer executable code, where the code when executed by a processor causes the processor to implement any of Aspects 1-14.

Aspect 18 is an apparatus for wireless communication at a first wireless device comprising a memory; and at least one processor coupled to the memory and configured to receive, from a control node, a measurement configuration to measure interference, the measurement configuration comprising a first measurement occasion and a second measurement occasion; measure interference at the first wireless device based on the measurement configuration, wherein the first wireless device communicates with a second wireless device via a relay node that relays transmissions between the first wireless device and the second wireless device; and report the interference at the first wireless device to the control node.

Aspect 19 is the apparatus of Aspect 18, further includes a transceiver coupled to the at least one processor.

Aspect 20 is the apparatus of Aspects 18 and 19, further includes that to measure the interference based on the first measurement occasion the at least one processor is further configured to measure the interference at the first wireless device while the relay node is active, wherein the interference while the relay node is active comprises a forwarded interference signal.

Aspect 21 is the apparatus of Aspects 18-20, further includes that the forwarded interference signal is received by the relay node and relayed to the first wireless device.

Aspect 22 is the apparatus of Aspects 18-21, further includes that the forwarded interference signal comprises self-interference relayed to the first wireless device, wherein the self-interference comprises a clutter echo due to a remote reflection or a local coupling at the relay node.

Aspect 23 is the apparatus of Aspects 18-22, further includes that the forwarded interference signal comprises cross link interference received by the relay node from the second wireless device and relayed to the first wireless device, wherein the cross link interference comprises a clutter echo due to a remote reflection or a local coupling at the relay node.

Aspect 24 is the apparatus of Aspects 18-23, further includes that the at least one processor is further configured to receive, from the control node, an indication to adjust a reception timing to measure the interference based on the first measurement occasion.

Aspect 25 is the apparatus of Aspects 18-24, further includes that the indication to adjust the reception timing comprises a timing reference or a window, wherein the indication accounts for a propagation delay of the forwarded interference signal.

Aspect 26 is the apparatus of Aspects 18-25, further includes that the first wireless device determines an adjustment to the reception timing and reports the adjustment to the reception timing to the control node.

Aspect 27 is the apparatus of Aspects 18-26, further includes that to measure the interference based on the second measurement occasion the at least one processor is further configured to measure the interference at the first wireless device while the relay node is deactivated, wherein the interference while the relay node is deactivated comprises an interference signal directly received by the first wireless device.

Aspect 28 is the apparatus of Aspects 18-27, further includes that the interference signal directly received by the first wireless device comprises self-interference or cross link interference.

Aspect 29 is the apparatus of Aspects 18-28, further includes that the measurement configuration comprises a notification to notify the first wireless device that the first measurement occasion is associated with an active relay node and that the second measurement occasion is associated with a deactivated relay node.

Aspect 30 is the apparatus of Aspects 18-29, further includes that the report of measured interference comprises a request to deactivate the relay node.

Aspect 31 is a method of wireless communication for implementing any of Aspects 18-30.

Aspect 32 is an apparatus for wireless communication including means for implementing any of Aspects 18-30.

Aspect 33 is a computer-readable medium storing computer executable code, where the code when executed by a processor causes the processor to implement any of Aspects 18-30.

What is claimed is:

1. An apparatus for wireless communication at a control node, comprising:
   a memory; and
   at least one processor coupled to the memory and configured to:
   transmit, to a first wireless device, a measurement configuration to measure interference, the measurement configuration comprising a first measurement occasion and a second measurement occasion, wherein the measurement configuration comprises a notification to notify the first wireless device that the first measurement occasion is associated with an active relay node and that the second measurement occasion is associated with a deactivated relay node; and
   receive, from the first wireless device, a report of measured interference at the first wireless device based on the measurement configuration, wherein part of the measured interference under the first measurement occasion is based at least on transmissions forwarded by a relay node.

2. The apparatus of claim 1, further comprising a transceiver coupled to the at least one processor.

3. The apparatus of claim 1, wherein the measured interference under the first measurement occasion comprises interference measurements while the relay node is active, wherein the interference while the relay node is active comprises a forwarded interference signal.

4. The apparatus of claim 3, wherein the forwarded interference signal is received by the relay node and relayed to the first wireless device.

5. The apparatus of claim 3, wherein the forwarded interference signal comprises self-interference relayed to the first wireless device, wherein the self-interference comprises a clutter echo due to a remote reflection or a local coupling at the relay node.

6. The apparatus of claim 3, wherein the forwarded interference signal comprises cross link interference received by the relay node from a second wireless device and relayed to the first wireless device, wherein the cross link interference comprises a clutter echo due to a remote reflection or a local coupling at the relay node.

7. The apparatus of claim 1, wherein the at least one processor is further configured to:
transmit, to the first wireless device, an indication to adjust a reception timing to measure the interference based on the first measurement occasion.

8. The apparatus of claim 7, wherein the indication to adjust the reception timing comprises a timing reference or a window, wherein the indication accounts for a propagation delay of a forwarded interference signal.

9. The apparatus of claim 7, wherein the at least one processor is further configured to:
receive, from the first wireless device, a timing indication indicating an adjustment to the reception timing determined by the first wireless device.

10. The apparatus of claim 1, wherein an interference signal directly received by the first wireless device comprises self-interference or cross link interference.

11. The apparatus of claim 1, wherein the at least one processor is further configured to:
transmit, to the relay node, an operation configuration to adjust a forwarding operation of the relay node based on the report of the measured interference at the first wireless device.

12. The apparatus of claim 1, wherein the report of the measured interference comprises a request to deactivate the relay node.

13. A method of wireless communication at a control node, comprising:
transmitting, to a first wireless device, a measurement configuration to measure interference, the measurement configuration comprising a first measurement occasion and a second measurement occasion, wherein the measurement configuration comprises a notification to notify the first wireless device that the first measurement occasion is associated with an active relay node and that the second measurement occasion is associated with a deactivated relay node; and
receiving, from the first wireless device, a report of measured interference at the first wireless device based on the measurement configuration, wherein part of the measured interference under the first measurement occasion is based at least on transmissions forwarded by a relay node.

14. An apparatus for wireless communication at a first wireless device, comprising:
a memory; and
at least one processor coupled to the memory and configured to:
receive, from a control node, a measurement configuration to measure interference, the measurement configuration comprising a first measurement occasion and a second measurement occasion, wherein the measurement configuration comprises a notification to notify the first wireless device that the first measurement occasion is associated with an active relay node and that the second measurement occasion is associated with a deactivated relay node;
measure the interference at the first wireless device based on the measurement configuration, wherein the first wireless device communicates with a second wireless device via a relay node that relays transmissions between the first wireless device and the second wireless device; and
report the interference at the first wireless device to the control node.

15. The apparatus of claim 14, further comprising a transceiver coupled to the at least one processor.

16. The apparatus of claim 14, wherein to measure the interference based on the first measurement occasion the at least one processor is further configured to:
measure the interference at the first wireless device while the relay node is active, wherein the interference while the relay node is active comprises a forwarded interference signal.

17. The apparatus of claim 16, wherein the forwarded interference signal is received by the relay node and relayed to the first wireless device.

18. The apparatus of claim 16, wherein the forwarded interference signal comprises self-interference relayed to the first wireless device, wherein the self-interference comprises a clutter echo due to a remote reflection or a local coupling at the relay node.

19. The apparatus of claim 16, wherein the forwarded interference signal comprises cross link interference received by the relay node from the second wireless device and relayed to the first wireless device, wherein the cross link interference comprises a clutter echo due to a remote reflection or a local coupling at the relay node.

20. The apparatus of claim 16, wherein the at least one processor is further configured to:
receive, from the control node, an indication to adjust a reception timing to measure the interference based on the first measurement occasion.

21. The apparatus of claim 20, wherein the indication to adjust the reception timing comprises a timing reference or a window, wherein the indication accounts for a propagation delay of the forwarded interference signal.

22. The apparatus of claim 20, wherein the first wireless device determines an adjustment to the reception timing and reports the adjustment to the reception timing to the control node.

23. The apparatus of claim 14, wherein an interference signal directly received by the first wireless device comprises self-interference or cross link interference.

24. The apparatus of claim 14, wherein a report of measured interference comprises a request to deactivate the relay node.

25. A method of wireless communication at a first wireless device, comprising:

receiving, from a control node, a measurement configuration to measure interference, the measurement configuration comprising a first measurement occasion and a second measurement occasion, wherein the measurement configuration comprises a notification to notify the first wireless device that the first measurement occasion is associated with an active relay node and that the second measurement occasion is associated with a deactivated relay node;

measuring the interference at the first wireless device based on the measurement configuration, wherein the first wireless device communicates with a second wireless device via a relay node that relays transmissions between the first wireless device and the second wireless device; and reporting the interference at the first wireless device to the control node.

26. The method of claim 25, wherein to measure the interference based on the first measurement occasion further comprising:

measuring the interference at the first wireless device while the relay node is active, wherein the interference while the relay node is active comprises a forwarded interference signal.

* * * * *